US012167791B2

(12) United States Patent
Latvis, Jr.

(10) Patent No.: US 12,167,791 B2
(45) Date of Patent: Dec. 17, 2024

(54) EQUIPMENT STAND OPTIMIZED TO MINIMIZE NOISE FLOOR

(71) Applicant: Michael P. Latvis, Jr., Buffalo, NY (US)

(72) Inventor: Michael P. Latvis, Jr., Buffalo, NY (US)

(*) Notice: Subject to any disclaimer, the term of this patent is extended or adjusted under 35 U.S.C. 154(b) by 0 days.

(21) Appl. No.: 18/355,565

(22) Filed: Jul. 20, 2023

(65) Prior Publication Data

US 2024/0008640 A1 Jan. 11, 2024

Related U.S. Application Data

(62) Division of application No. 17/810,967, filed on Jul. 6, 2022, now Pat. No. 11,751,682.

(51) Int. Cl.
*A47B 47/02* (2006.01)
*G10K 11/162* (2006.01)
*A47B 47/00* (2006.01)

(52) U.S. Cl.
CPC .......... *A47B 47/021* (2013.01); *G10K 11/162* (2013.01); *A47B 47/00* (2013.01)

(58) Field of Classification Search
CPC ..... A47B 47/021; A47B 47/00; A47B 96/024; A47B 81/00; A47B 19/002; A47B 47/0008; A47B 47/0016; A47B 47/0083; A47F 7/00; G10K 11/162
See application file for complete search history.

(56) References Cited

U.S. PATENT DOCUMENTS 3,784,146 A * 1/1974 Matthews ........... F16F 15/0232 248/188.8
3,945,501 A 3/1976 Jay
4,191,112 A 3/1980 Maldonado
4,275,666 A * 6/1981 Schriever ........... A47B 87/0246 108/190
4,419,938 A * 12/1983 Kaut ...................... A47B 47/05 108/190
4,773,547 A 9/1988 Bell
4,948,076 A * 8/1990 Sumrell ................. F16M 11/24 248/176.1
D321,101 S * 10/1991 Zucker ........................ D6/677.1
(Continued)

OTHER PUBLICATIONS

Michael P. Latvis, Jr., VXR Audio Stand.
(Continued)

*Primary Examiner* — Devin K Barnett
(74) *Attorney, Agent, or Firm* — Simpson & Simpson, PLLC

(57) ABSTRACT

A storage stand, comprising at least one shelf, the shelf bounded by a perimeter, the perimeter having at least four points defining a polygon, the at least four points forming a mounting axis of rotation with respect to its adjacent clockwise point and its adjacent counter-clockwise point, and at least four mounting locations arranged within the perimeter of the at least one shelf, each of the four mounting locations having a compression centroid, each mounting location forms a compression axis of rotation with respect to its adjacent clockwise mounting location and its adjacent counterclockwise mounting location such that at least one compression axis of rotation is non-parallel to its respective mounting axis of rotation.

6 Claims, 10 Drawing Sheets

(56) References Cited

U.S. PATENT DOCUMENTS

| | | | | | |
|---|---|---|---|---|---|
| 5,285,995 | A * | 2/1994 | Gonzalez | G05D 19/02 | 248/550 |
| 5,584,398 | A * | 12/1996 | Lin | F21V 33/002 | 362/253 |
| 5,588,541 | A * | 12/1996 | Goetz | A47B 87/008 | 211/186 |
| 5,595,312 | A * | 1/1997 | Dardashti | A47B 96/06 | 211/41.12 |
| 5,881,653 | A * | 3/1999 | Pfister | A47B 87/0223 | 211/188 |
| 5,964,360 | A * | 10/1999 | Hwang | A47B 87/0215 | 211/186 |
| 5,979,677 | A * | 11/1999 | Simpson, II | A63H 3/52 | 211/13.1 |
| 6,000,671 | A * | 12/1999 | Helms | F16F 15/02 | 248/563 |
| 6,062,150 | A * | 5/2000 | Sikora | A47B 87/0223 | 211/186 |
| 6,155,435 | A * | 12/2000 | Malik | A47B 57/26 | 211/41.12 |
| D441,217 | S * | 5/2001 | Pepin | D6/678.1 | |
| 6,247,414 | B1 * | 6/2001 | Sikora | A47B 87/0223 | 108/190 |
| 6,648,295 | B2 * | 11/2003 | Herren | F16F 15/0275 | 248/562 |
| D485,716 | S * | 1/2004 | Boron | D6/574 | |
| D485,717 | S * | 1/2004 | Boron | D6/707.24 | |
| 6,895,870 | B1 * | 5/2005 | Bizlewicz | F16F 15/02 | 211/151 |
| D507,901 | S * | 8/2005 | Wicha | D6/678.1 | |
| D509,390 | S * | 9/2005 | Boron | D6/705 | |
| D516,839 | S * | 3/2006 | Wicha | D6/678.1 | |
| D522,275 | S * | 6/2006 | Becker | D6/678.1 | |
| 7,640,868 | B2 * | 1/2010 | Morrison | H04R 1/026 | 211/151 |
| 7,942,379 | B2 * | 5/2011 | Heiland | G03F 7/709 | 188/380 |
| D650,202 | S * | 12/2011 | Klein | D6/677.1 | |
| 8,215,245 | B2 * | 7/2012 | Morrison | H04R 1/026 | 211/151 |
| 8,302,788 | B2 | 11/2012 | Vargo | | |
| 8,459,476 | B2 * | 6/2013 | Malekmadani | A47B 87/0223 | 211/188 |
| 9,151,643 | B2 * | 10/2015 | Cheng | G01D 11/30 | |
| 9,232,857 | B2 * | 1/2016 | Lai | A47B 87/0223 | |
| 9,282,819 | B2 * | 3/2016 | Blake | A47B 87/002 | |
| D758,767 | S | 6/2016 | Andersson | | |
| 9,370,241 | B1 * | 6/2016 | Dilmaghani | A47B 13/08 | |
| 9,538,846 | B2 * | 1/2017 | Reinhart | A47B 96/02 | |
| 9,920,811 | B1 | 3/2018 | Morrison | | |
| 9,930,963 | B2 * | 4/2018 | Guizzardi | A47B 91/026 | |
| 10,045,615 | B2 | 8/2018 | Latvis, Jr. | | |
| 10,100,526 | B2 * | 10/2018 | Knudson | A47B 47/0091 | |
| 10,187,712 | B2 | 1/2019 | Latvis, Jr. | | |
| D893,925 | S * | 8/2020 | Lukyanov-Cherny | D6/678.1 | |
| 11,083,293 | B2 * | 8/2021 | Davis | A47B 47/0083 | |
| 11,672,337 | B1 * | 6/2023 | Clayton | A47B 49/004 | 312/202 |
| 11,819,123 | B2 * | 11/2023 | Zhang | A47B 3/10 | |
| 2006/0006307 | A1 * | 1/2006 | Mogilever | F16F 15/04 | 248/638 |
| 2008/0156759 | A1 * | 7/2008 | Lai | A47B 47/0083 | 211/187 |
| 2009/0084740 | A1 * | 4/2009 | Lin | A47B 87/0223 | 211/41.14 |
| 2009/0152225 | A1 * | 6/2009 | Lee | A47B 47/024 | 108/106 |
| 2017/0055701 | A1 * | 3/2017 | Latvis, Jr. | A47B 91/024 | |
| 2017/0064422 | A1 * | 3/2017 | Latvis, Jr. | F16F 15/021 | |
| 2019/0038951 | A1 * | 2/2019 | Curry | F16M 11/22 | |
| 2019/0254424 | A1 * | 8/2019 | Rassat | F16B 12/10 | |

OTHER PUBLICATIONS

Michael P. Latvis, Jr., SXRC Audio Stand.
Michael P. Latvis, Jr., SXR Audio Stand.
Michael P. Latvis, Jr., RXR Audio Stand.

* cited by examiner

EQUIPMENT STAND OPTIMIZED TO MINIMIZE NOISE FLOOR

CROSS-REFERENCE TO RELATED APPLICATIONS

This application is a divisional of, and claims priority under 35 U.S.C. § 120 to, U.S. patent application Ser. No. 17/810,967, filed Jul. 6, 2022, which application is incorporated by reference in its entirety herein.

FIELD

The present invention relates generally to an audio stand optimized to minimize floor noise, having a specific non-symmetric arrangement of a plurality of mounting brackets and their respective compression members.

BACKGROUND

An audio noise floor is the measure of the signal created from the sum of all the noise sources and unwanted signals within a measurement system, where noise is defined as any signal other than the one being monitored. In an audio system, the noise floor is the amount of sound, measured in decibels, that a piece of gear naturally produces when you're not running a signal through it. A decibel (dB) is a unit for expressing the ratio between two physical quantities such as measuring the relative loudness of sounds. One decibel equals 10 times the common logarithm of the power ratio. For example, a 60-dB sound, such as normal speech, is six powers of 10 (i.e., $10^6$, or 1,000,000) times more intense than a barely detectable sound, such as a faint whisper, of 1 dB. In a complete setup, the noise floor is the sum of all the noise generated by individual pieces of equipment at rest.

An incident wave is a wave that is approaching the boundary, such as a structure, but hasn't reached it yet. A reflected wave is a wave that is moving away from the boundary in the same medium as the incident wave after it has interacted with the boundary. A transmitted wave moves away from the boundary, on the other side of the boundary from the incident wave (i.e., the remainder of the wave that travelled through the structure). An incident wave can also cause resonance as it arrives at the structure, if the wave's frequency matches the structure's natural frequency.

Natural frequency is the frequency or rate that an object vibrates naturally. When an incident wave (otherwise known as a signal) arrives at an object, and the incident wave's frequency is equal to or close to the object's natural frequency, vibrations of increasing magnitudes occur as a consequence, at the object's natural frequency. These consequential vibrations are known as resonance.

Generally speaking, the more mass that is added to a structure, the lower the natural frequency. If the damping is increased, the magnitude of the vibrations will decrease, but there will be a broader response range. When an entire object is vibrating, it tends to vibrate about the object's center of mass.

It should be noted that signals with a frequency below the natural frequency of a structure will pass through, or transmit through, the structure. This invention seeks to minimize resonance of unwanted audio signals, otherwise known as the noise floor, described above. This is done by increasing the natural frequency of a structure by increasing the structure's stiffness.

In general, stiffness is a structure's ability to resist elastic deformation. Many solutions that increase a structures stiffness are achieved by adding more structural elements, such as cross members, to an already existing structure. This often achieves the goal of increasing stiffness in many crude applications, however, in the realm of audio equipment as well as other systems concerned with vibrations, simply adding additional structural elements can adversely affect the noise floor of the structure at large due to the additional structural elements having their own natural frequency.

A Cartesian coordinate system in a plane is a coordinate system that specifies each point uniquely by a pair of numerical coordinates, which are the signed distances to the point from two fixed perpendicular oriented lines, measured in the same unit of length. A Cartesian plane, also called a coordinate plane, is formed by the intersection of two perpendicular axes, such as an "x axis" and a "y axis". There are four quadrants in a cartesian plane. The signs of the coordinates in each quadrant is given in (x,y) form are as (+, +) for the first quadrant, (−, +) for the second quadrant, (−, −) for the third quadrant, and (+, −) for the fourth quadrant.

Compression members are structural elements that are pushed together or carry a load; they are subjected to axial compressive forces.

When an incident wave arrives at a structure, it tends to displace the structure to a position of greater resistance to vibration, i.e., high stiffness at the incident waves largest amplitude.

The force applied to a mass, m, in a structure is proportional to the amount the structure is stretched "x" from its resting position. This stretched position corresponds with the amplitude. The proportionality constant, k, is the stiffness of the structure and has units of force/distance (e.g., 1bf/in or N/m). The negative sign indicates that the force of the structure is always opposing the motion of the mass:

$$F_s=-kx$$

Newton's second law of motion reads, "The change of motion of an object is proportional to the force impressed; and is made in the direction of the straight line in which the force is impressed." In other words, the sum of the forces generated by the mass is proportional to the acceleration of the mass.

$$\Sigma F = ma = m\frac{d^2x}{dt^2} = m\ddot{x}$$

where F is a force, a is a linear acceleration, and m is the mass.

The mass moment of inertia, usually denoted I, measures the extent to which an object resists rotational acceleration about an axis, and is the rotational analogue to mass, m in Newton's second law. Mass moments of inertia have units of dimension mass×length. Newton's second law for rotation is represented algebraically as:

$$\tau=Ia$$

where r is the torque, I is the mass moment of inertia, and a is the angular acceleration.

Torque occurs when a force, F, orthogonally acts at a distance from the axis of rotation, r. The angular acceleration, a, must have units of radians per second squared (radians are technically unitless); this is achieved by dividing the linear acceleration, a, by the distance from the axis of rotation, r. These terms are represented algebraically as:

$$\tau=Fr$$

considering that force is equal to the mass multiplied by the acceleration:

$$\tau = mar$$

$$\alpha = \frac{a}{r}$$

Substituting both of these into Newton's second law for rotation yields:

$$mar = I\frac{a}{r}$$

A general equation for the inertia of a point mass is thus defined as:

$$I=mr^2$$

Using successive integration, it can be shown that the deflection is inversely proportional to $EI_A$ where E is the modulus of elasticity of the material surrounding the axis of rotation. Here, $I_A$ represents the area moment of inertia, with the area being a cross section and orthogonal to the axis of rotation, which has different units than mass moment of inertia but still stands as a representation of an object's resistance to angular acceleration.

In structures where there are two parallel axis of rotation, such as a four-legged kitchen table (tabletop in the x-z plane) that is receiving a force from the left side (x direction), the legs (y direction) tend to rotate within a few degrees about their respective axis of rotation (both in the z direction) until the structure reaches a position of greatest resistance to the force. However, offsetting these axes of rotation in such a way where they are no longer parallel to one another dramatically reduces the degree to which the legs of the table would rotate. Thus, offsetting the axes of rotation increases the moment of inertia.

Since deflection is inversely proportional to the product $EI_A$, increasing either of these variables will decrease the amount of deflection in a stiffness test. Deflection is inversely related to stiffness. Thus, increasing inertia also results in an increase in stiffness.

The force of the structure in a simple system is the dominating term; therefore, other terms are negligible. Thus:

$$\Sigma T=F_s$$

$$m\ddot{x}=-kx$$

This gives way to the ordinary differential equation (ODE (1)):

$$m\ddot{x}+kx=0$$

The above ODE(1) has the solution:

$$x(t)=A\cos(2\pi f_n t)$$

This ODE(1) describes the displacement of a given structure's center of mass over time if the structure were to be "stretched" or displaced initially, where A is the amplitude, and $f_n$ is the undamped natural frequency. In a simple system, the undamped natural frequency is defined as:

$$f_n = \frac{1}{2\pi}\sqrt{\frac{k}{m}}$$

Therefore, the stiffness of the structure, k, has a quadratic relationship to the undamped natural frequency of the structure, and the mass of the structure, m, has an inverse-square relationship to the undamped natural frequency of the structure.

The above-described system is ideal, and undamped, with no outside forces affecting the structure. Real-world systems are not ideal, damped, and they encounter outside forces frequently. Damping herein refers to the structure's ability to dissipate vibrations over time. A system's resistance to motion is directly proportional to the velocity of the mass. The damping force, D, is defined as:

$$D = -R\frac{dx}{dt} = -R\dot{x}$$

Where R is a constant of proportionality, known as the damping factor. The above ODE(1) equals zero because there are no outside forces, meaning f(t)=0. An input force would mean f(t)≠0. This input force can take many forms, including an oscillating force described below.

Again using Newton's second law, the resulting ODE(2) is:

$$m\ddot{x}+R\dot{x}+kx=f(t)$$

An oscillating force, such as an impeding vibration, can be represented as:

$$f(t)=a\sin(\omega t)+b\cos(\omega t)$$

Where a and b are constants and w is the angular frequency of the applied oscillations. In other words, w is the incident wave's angular frequency.

The above ODE(2) has the solution:

$$S = \frac{-R \pm \sqrt{R^2 - 4mk}}{2m}$$

$$S = \alpha \pm \beta i$$

$$x(t) = e^{\alpha t}(A\sin(\beta t) + B\cos(\beta t))$$

Where S is an auxiliary equation used to derive solutions, α represents the real number and β represents corresponding value attached to the imaginary term that is collectively equal to S.

$R^2-4mk>0$ (or $R^2>4mk$), this produces a complementary function (transient) of the form where there are no oscillations. This is known as a heavily damped system.

When $R^2-4mk<0$ there will be an imaginary term β. This means that the damping factor is less than 4 times the mass and stiffness, or R 2<4mk. This produces a sinusoidal transient modulated by pure exponential decay, otherwise known as a lightly damped system. Graphically, it can be observed that the peaks of the wave tend to diminish with time. These peaks represent the structure being displaced from its resting position initially by the input force and then oscillating with smaller and smaller amplitudes until it returns to its original resting position.

The above-described lightly damped system can be achieved by having a high mass and comparatively low stiffness system, but if a lightly damped system were to be created with the intent of keeping mass low in the interest of making the system easy to disassemble, transport, and reassemble, as well as for other reasons as specified above, then the stiffness must be the dominating term.

Inertia is an object's resistance to angular acceleration, and is defined as the mass times the distance from the axis of rotation squared, for a point mass. High inertia is desired for this invention. If the intended structure is designed with the intent of keeping mass low while increasing inertia, then the distance from the axis of rotation must be increased.

Thus, there is a long-felt need for an apparatus with a simple, elegant structure that has a high natural frequency that occurs as a result of high stiffness without a detrimental increase in mass. More specifically, there is a long-felt need for an audio equipment stand optimized to minimize noise floor.

Further, there is a is a long-felt need for an apparatus with high inertia that occurs as a result of increasing the distance from the axes of rotation. More specifically, there is a long-felt need for a storage stand with intentionally non-paralleled axes of rotation to increase the stiffness of the structure.

SUMMARY

The present invention generally comprises a storage stand, the storage stand having at least one shelf, the shelf bounded by a perimeter, the perimeter having at least four points defining a polygon, the at least four points forming a mounting axis of rotation with respect to its adjacent clockwise point and its adjacent counter-clockwise point, and at least four mounting locations arranged within the perimeter of the at least one shelf, each of the four mounting locations having a compression centroid, each mounting location forms a compression axis of rotation with respect to its adjacent clockwise mounting location and its adjacent counterclockwise mounting location such that at least one compression axis of rotation is non-parallel to its respective mounting axis of rotation.

The present invention could also comprise an audio equipment stand, the audio equipment stand comprising at least one shelf, the shelf bounded by a perimeter, at least three mounting brackets, each of the mounting brackets having a mounting section and a compression section, each of the compression sections having a compression aperture, the compression aperture having a compression centroid, and, securement means operatively arranged to secure the at least three mounting brackets to at least three mounting locations on the shelf, which mounting locations are internal to the perimeter such that at least three mounting centroids form at least three vertices of a first polygon, wherein at least three compression members provide support in a vertical direction for the mounting brackets and the at least one shelf, wherein the compression centroids establish vertices of a second polygon having at least one internal angle that is different from any other internal angle of the first polygon.

The present invention generally is arranged to emulate a structure being stretched, or displaced, from what would otherwise be its resting position. By starting from this position, the stiffness of the structure can be increased and the desired effect of high stiffness with relatively low weight as elucidated above is achieved through the configuration of the present invention, described herein.

A primary object of the present invention is to provide an audio stand optimized to minimize floor noise.

Another object is to provide an assembly having an arrangement where the mass multiplied by the stiffness coefficient is greater than the squared value of the dampening coefficient.

A further object is to provide for an assembly having an arrangement where the stiffness coefficient is larger than the mass of the assembly.

Still another object is to provide for an assembly having an arrangement where the mass multiplied by the stiffness coefficient is greater than the squared value of the dampening coefficient, having at least one constrained layer damping plate.

A still further object of the present invention is to provide for an assembly having an arrangement where the stiffness coefficient is larger than the mass of the assembly, having at least one constrained layer damping plate.

An even further object of the present invention is to provide for an assembly having at least one constrained layer damping plate that is arranged to have at least three mounting brackets affixed thereto, where the mounting bracketing each include a compression aperture, where the respective compression apertures each include hypothetical mass, which has a centroid forming a polygonal shape, where that polygonal shape is different than another polygonal shape formed by the mounting centroids created by the at least three mounting brackets being affixed to the damping plate—thereby reducing noise floor of the assembly and increasing its stiffness.

Yet another object of the present invention is to offset the compression axis of rotation from its respective mounting axis of rotation, such that the compression axis of rotation and the mounting axis of rotation are non-parallel, thereby increasing the moment of inertia.

These and other objects, features, and advantages of the present invention will become readily apparent upon a review of the following detailed description of the invention, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
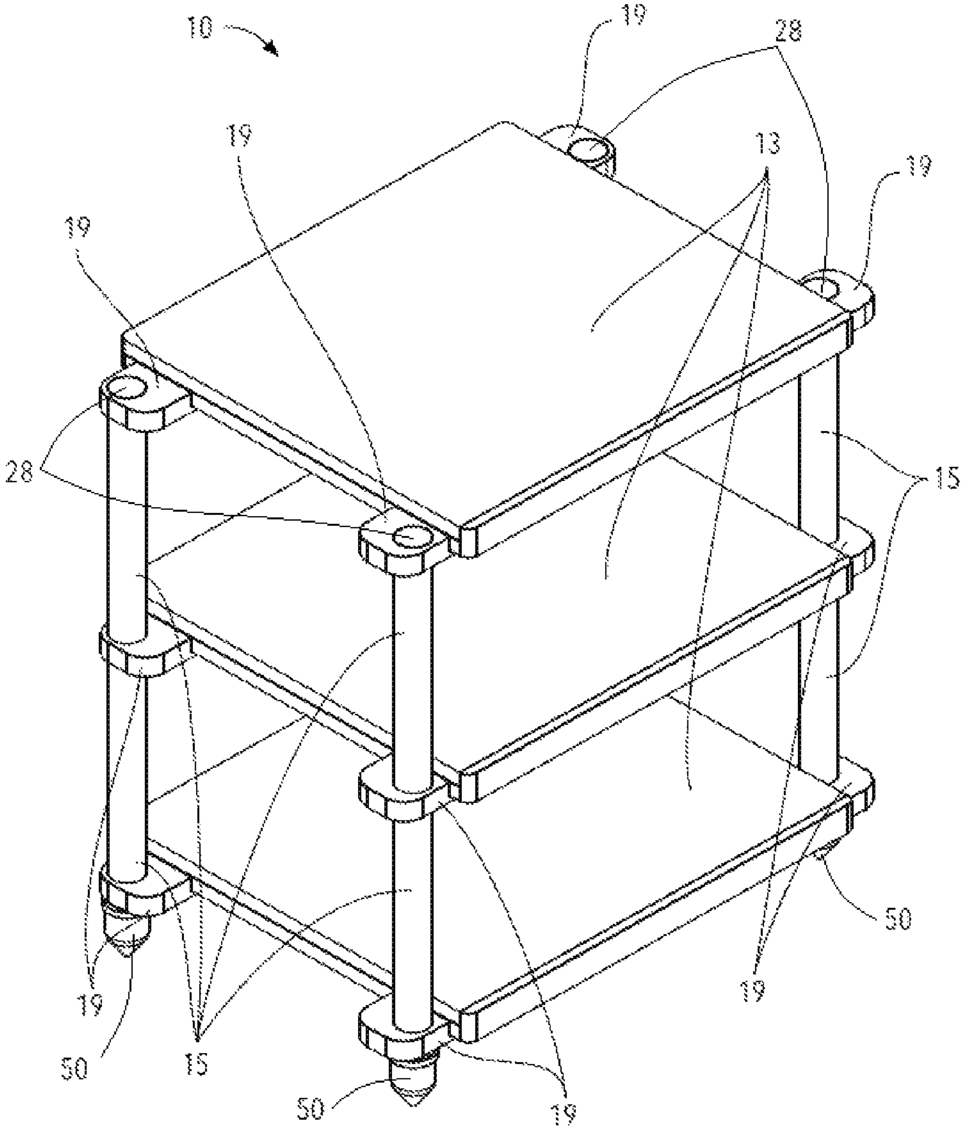
FIG. 1 is a perspective view of the present invention.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

It should also be appreciated that examples provided herein may conclude with "etc." which should be interpreted to mean viable alternatives within the scope of the named examples, such that unnamed examples would be apparent to one having ordinary skill in the art.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein.

It should be appreciated that the embodiments as illustrated are only one of a variety of possible embodiments of the claimed invention. It should also be appreciated that directional adjectives, such as "upper," "lower", "right", "left", and similar variations, are to be interpreted in view of the corresponding drawings and are intended to be exemplary.

It should be further appreciated that the term "centroid" as used herein, and especially used herein with respect to the term "centroid" when referring to an aperture, is defined as follows: a centroid of an aperture is defined to be the same as the centroid of an object which completely fills the aperture, where the centroid of an object is defined as the center of mass of the object where the object is of uniform density.

It should be noted that the term "constrained layer damping plate" refers to a mechanical engineering technique for the suppression of vibration, where the "plate" includes these vibration suppression qualities. Typically, constrained layer damping components are comprised of a viscoelastic, or other damping materials, e.g., rubber, polyurethane, polyvinyl chloride (PVC), etc., and are sandwiched between two sheets of stiff, or rigid, material that lack sufficient damping on its own.

It should also be noted that the terms "plate" and "shelf" are substantially synonymous and may be used interchangeably herein.

It should be noted that reference numerals following the "ab.cd" format where the number in the "ab" field is in reference to the greater plurality to which the part belongs, the number in the "c" field is in reference to the level which the part is removably affixed to, starting at 0 and then ascending correspondingly in height with each shelf, and the number in the "d" field is in reference to the position the part is removably affixed to, starting from 1 in the upper right corner from the top perspective, and ascending by 1 with each vertex when considered in a counterclockwise order, as viewed from the top of the apparatus. For example, 19.12 is a mounting bracket (19.12), which is removably affixed on the first level (19.12) in the upper left position from the top perspective (19.12), compression member 15.24 belongs to the plurality of compression members (15.24), which is removably affixed on the second level (15.24) in the lower right position from the top perspective (15.24).

Adverting now to the figures, FIG. 1 is a perspective view of audio equipment stand 10. Audio equipment stand 10 generally comprises: vortex feet 50, shelf 13, mounting brackets 19 secured to the underside of each shelf 13, end caps 28, and compression members 15, where each of plurality of compression members 15 is arranged to engage two respective mounting brackets 19, each vortex foot 50 is arranged to engage one respective mounting bracket 19, and each end cap is arranged to engage one respective mounting bracket 19.

Figure 2:
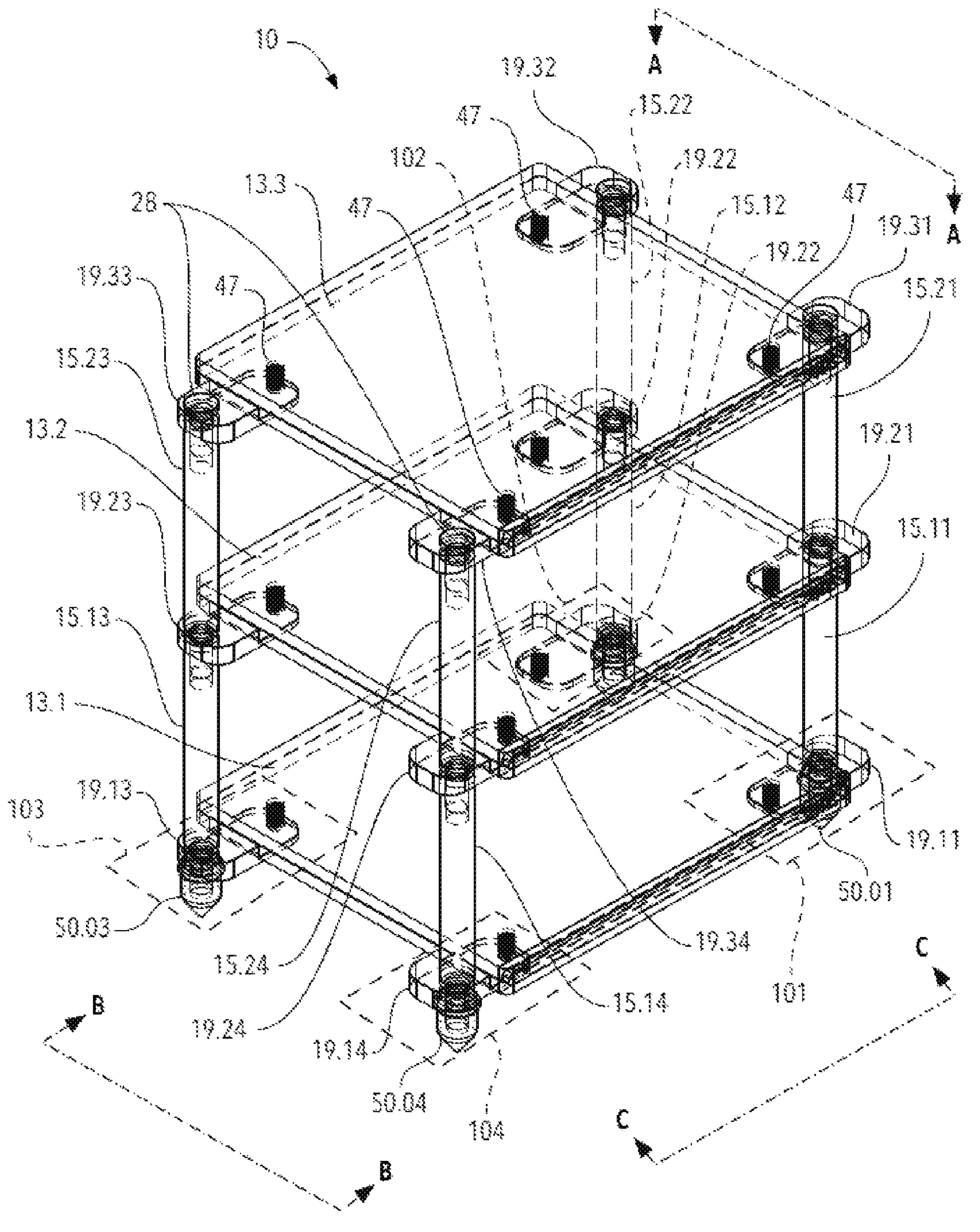
FIG. 2 is a skeletal perspective view of the invention shown in FIG. 1.
Figure 3B:
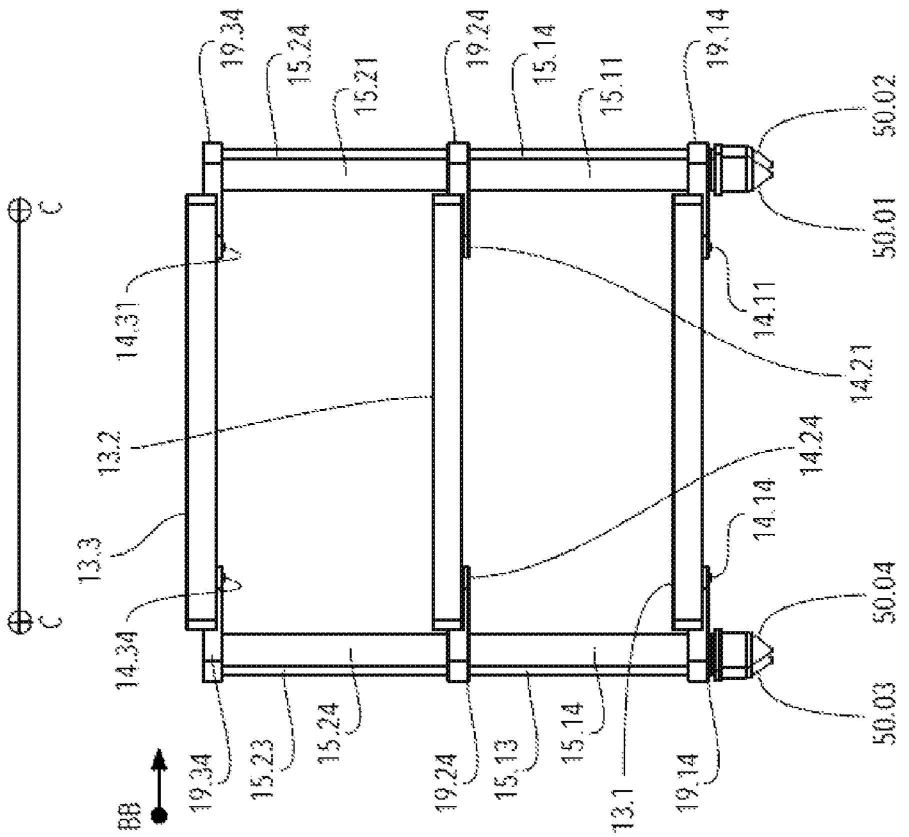
FIG. 3B is a front view of the invention shown in FIG. 1.
Figure 3A:
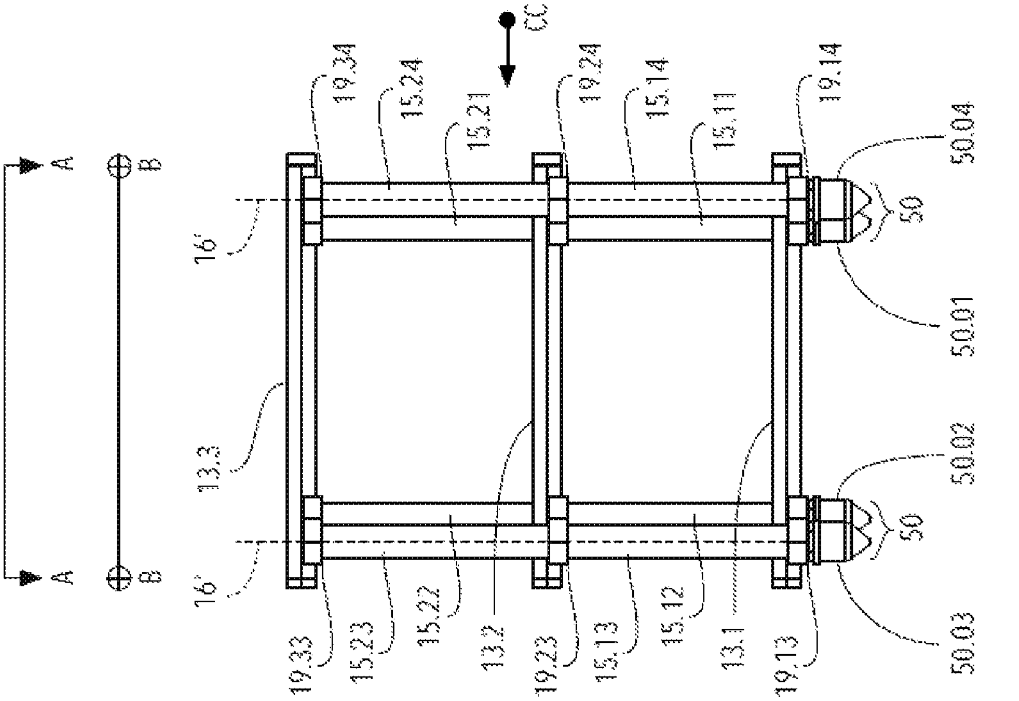
FIG. 3A is a left-side view of the invention shown in FIG. 1.

The following description should be taken in view of FIGS. 2 through 3B. FIG. 2 is a skeletal perspective view of audio equipment stand 10; FIG. 3A is a right-side view of audio equipment stand 10 taken from perspective CC, and FIG. 3B is a front view of audio equipment stand 10 taken from perspective BB.

The present embodiment of the invention has a zeroth level 90, a first level 91, a second level 92 and a third level 93. Other embodiments have as few as one or two levels. Additional embodiments have more than three levels. First level shelf 13.1 defines first level 91, second level shelf 13.2 defines second level 92, third level shelf 13.3 defines third level 93, and so on.

First position 101 is defined as the upper right corner of the respective level when viewed from the top perspective AA. Second position 102 is defined as the upper left corner of the respective level when viewed from the top perspective AA. Third position 103 is defined as the lower left corner of the respective level when viewed from the top perspective AA. Fourth position 104 is defined as the lower right corner of the respective level when viewed from the top perspective AA.

Vortex feet 50 abut a floor or ground surface at each of their conical tips 45. Vortex foot 50.01 inhabits the zeroth level at the first position 101. Vortex foot 50.02 inhabits the zeroth level at the second position 102. Vortex foot 50.03 inhabits the zeroth level at the third position 103. Vortex foot 50.04 inhabits the zeroth level at the fourth position 104. Vortex feet are each removably affixed to one of the plurality of mounting brackets 19 at each level. Vortex foot 50.01 is removably affixed to first level mounting bracket at first position 19.11. Vortex foot 50.02 is removably affixed to first level mounting bracket at second position 19.12. Vortex foot 50.03 is removably affixed to first level mounting bracket at third position 19.13. Vortex foot 50.04 is removably affixed to first level mounting bracket at fourth position 19.14.

Each of the plurality of mounting brackets 19 can be removably affixed to one or two of the plurality of compression members 15, and each of the plurality of mounting brackets 19 are removably affixed to one of the shelves 13 at one of the plurality of mounting apertures 29. Securement means for securing mounting brackets to their respective shelf in one embodiment comprise: a threaded aperture at each of the mounting bracket's mounting apertures; a threaded partial through-bore at each of the shelf's mounting locations; and a threaded fastener (such as a bolt) that mechanically joins said mounting bracket and said shelf together at their respective mounting aperture and mounting location.

Securement means for securing mounting brackets to their respective shelf in one embodiment comprise: a smooth aperture at each of the mounting bracket's mounting aperture; a threaded male end protrusion at each of the shelf's mounting locations; and a threaded fastener (such as a nut) that mechanically joins said mounting bracket and said shelf together at their respective mounting aperture and mounting location.

The highest level, which in this embodiment is third level 93, has mounting brackets 19 that are each removably affixed to one of the plurality of compression members 15, and each of mounting brackets 19 on third level 93 are removably affixed to one of the plurality of end caps 28. Each mounting bracket 19 has mounting aperture 29 that is removably affixed to shelf 13 at mounting location 47. Mounting location 47 is on the respective shelf, and the mounting aperture 29 is on the bracket.

First level mounting bracket at the first position 19.11 is removably affixed to first level compression member at first position 15.11. First level mounting bracket at second position 19.12 is removably affixed to first level compression member at second position 15.12. First level mounting bracket at third position 19.13 is removably affixed to first level compression member at third position 15.13. First level mounting bracket at fourth position 19.14 is removably affixed to first level compression member at first position 15.14.

First level mounting bracket at first position 19.11 is also removably affixed to first level shelf 13.1 at the first level mounting aperture at first position 29.11. First level mounting bracket at second position 19.12 is also removably affixed to first level shelf 13.1 at first level mounting aperture at second position 29.12. First level mounting bracket at third position 19.13 is also removably affixed to first level shelf 13.1 at first level mounting aperture at third position 29.13. First level mounting bracket at fourth position 19.14 is also removably affixed to first generally polygonal constrained layer dampening shelf 13.1 at the first level mounting aperture at fourth position 29.14.

Each of the plurality of compression members 15 that are removably affixed to one of the plurality of mounting brackets 19 on first level 91 are also removably affixed to one of the plurality of mounting brackets 19 on second level 92. First level compression member at first position 15.11 is removably affixed to both first level mounting bracket at first position 19.11 and second level mounting bracket at first position 19.21. First level compression member at second position 15.12 is removably affixed to both first level mounting bracket at second position 19.12 and second level mounting bracket at second position 19.22. First level compression member at third position 15.13 is removably affixed to both first level mounting bracket at third position 19.13 and second level mounting bracket at third position 19.23. First level compression member at fourth position 15.14 is removably affixed to both first level mounting bracket at fourth position 19.14 and second level mounting bracket at the fourth position 19.24.

Second level mounting bracket at first position 19.21 is also removably affixed to second level shelf 13.2 at second level mounting aperture at first position 29.21. Second level mounting bracket at second position 19.22 is also removably affixed to second level shelf 13.2 at second level mounting aperture at second position 29.22. Second level mounting bracket at third position 19.23 is also removably affixed to second level shelf 13.2 at second level mounting aperture at third position 29.23. Second level mounting bracket at fourth position 19.24 is also removably affixed to second level shelf 13.2 at second level mounting aperture at fourth position 29.24.

Second level mounting bracket at first position 19.21 is removably affixed to first level compression member at first position 15.11, and second level compression member at first position 15.21. Second level mounting bracket at second position 19.22 is removably affixed to first level compression member at second position 15.12, and second level compression member at second position 15.22. Second level mounting bracket at third position 19.23 is removably affixed to first level compression member at third position 15.13, and second level compression member at third position 15.23. Second level mounting bracket at fourth position 19.24 is removably affixed to first level compression member at fourth position 15.14, and second level compression member at fourth position 15.24.

Each of the plurality of compression members 15 that are removably affixed to one of the plurality of mounting brackets 19 on second level 92 are also removably affixed to one of the plurality of mounting brackets 19 on third level 93. Second level compression member at first position 15.21 is removably affixed to both second level mounting bracket at the first position 19.21 and third level mounting bracket at first position 19.31. Second level compression member at second position 15.22 is removably affixed to both second level mounting bracket at second position 19.22 and third level mounting bracket at second position 19.32. Second level compression member at third position 15.23 is removably affixed to both second level mounting bracket at third position 19.23 and third level mounting bracket at third position 19.33. Second level compression member at fourth position 15.24 is removably affixed to both second level mounting bracket at fourth position 19.24 and third level mounting bracket at fourth position 19.34.

Third level mounting bracket at first position 19.31 is also removably affixed to third level shelf 13.3 at third level mounting aperture at first position 29.31. Third level mounting bracket at second position 19.32 is also removably affixed to third level shelf 13.3 at third level mounting aperture at second position 29.32. Third level mounting bracket at the third position 19.33 is also removably affixed to third level shelf 13.3 at third level mounting aperture at third position 29.33. Third level mounting bracket at fourth position 19.34 is also removably affixed to third level shelf 13.3 at third level mounting aperture at fourth position 29.34.

Third level mounting bracket at first position 19.31 is removably affixed to second level compression member at first position 15.21, and third level end cap at first position 28.31. Third level mounting bracket at second position 19.32 is removably affixed to second level compression member at second position 15.22, and third level end cap at second position 28.32. Third level mounting bracket at third position 19.33 is removably affixed to second level compression member at third position 15.23, and third level end cap at third position 28.33. Third level mounting bracket at fourth position 19.34 is removably affixed to second level compression member at fourth position 15.24, and third level end cap at fourth position 28.34.

Figure 4:
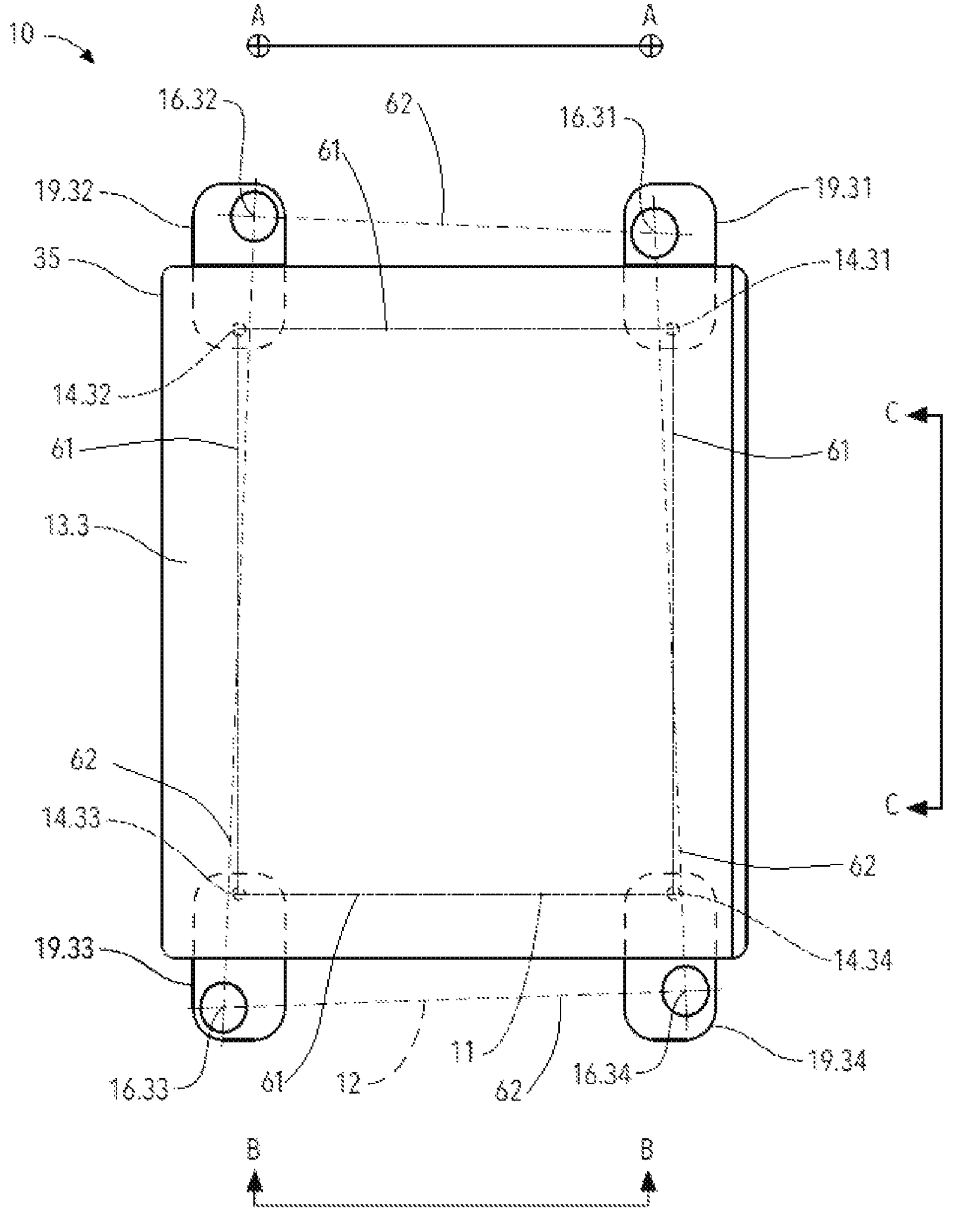
FIG. 4 is a top perspective view of audio equipment stand 10 taken from perspective AA.
Figure 5:
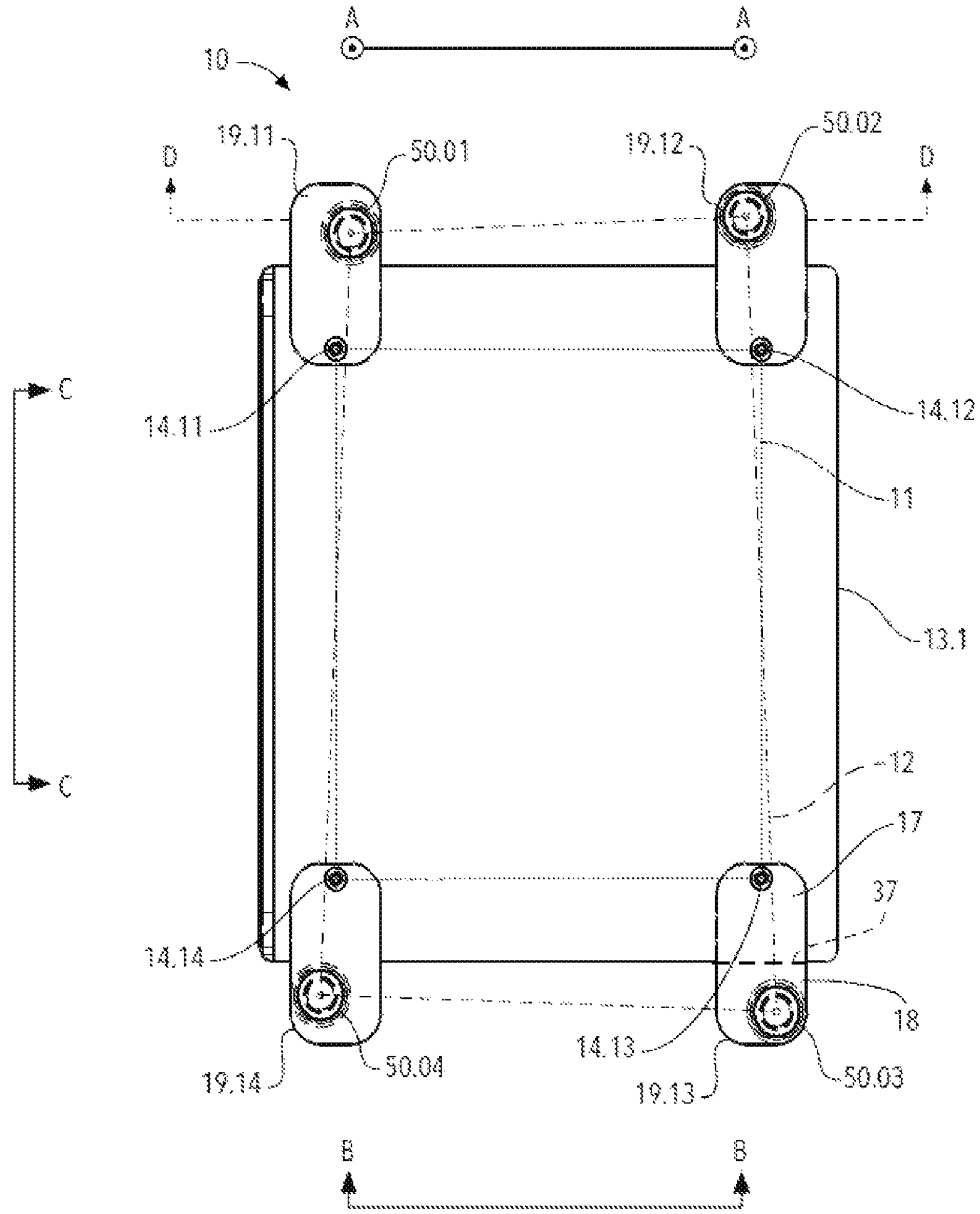
FIG. 5 is a bottom view of audio equipment stand 10.
Figure 6:
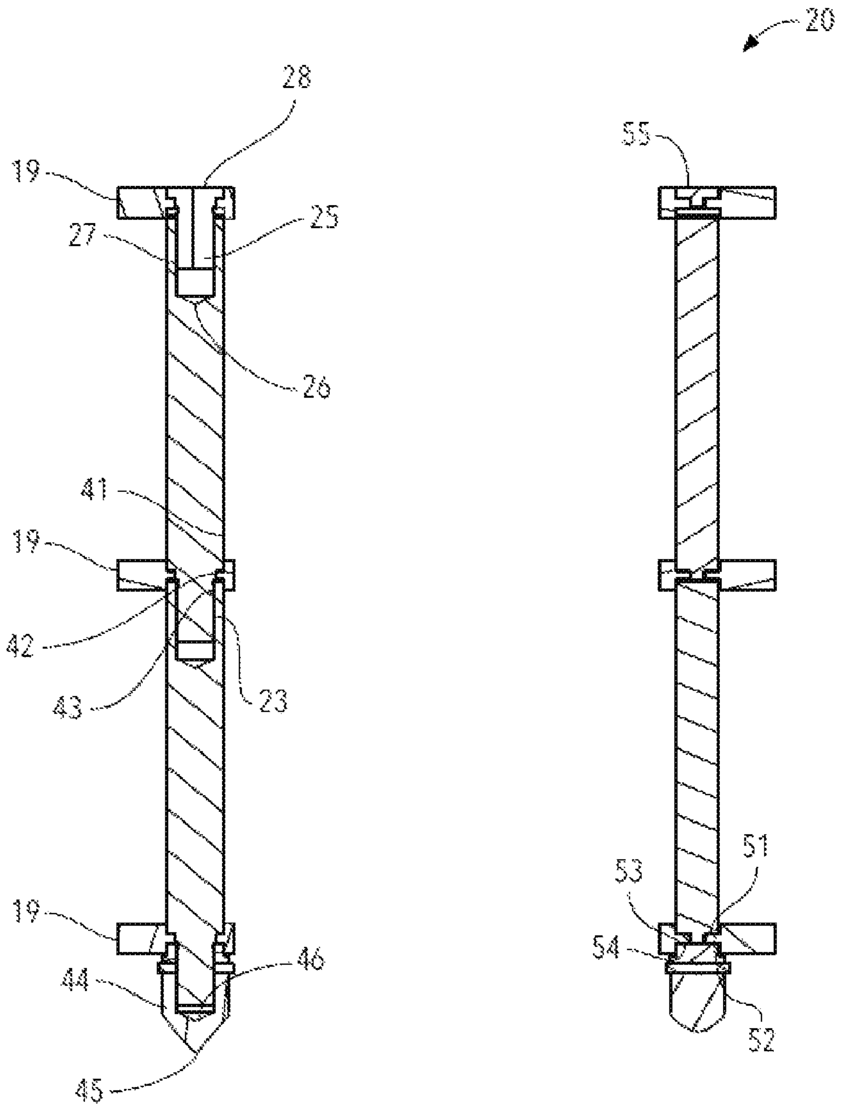
FIG. 6 is a front cross-sectional view of compression assembly 20 taken from perspective DD.
Figure 7A:
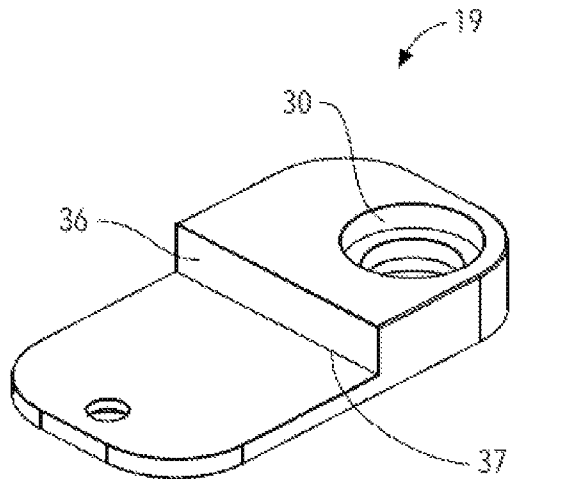
FIG. 7A is a perspective view of type 1 mounting bracket 31.
Figure 7B:
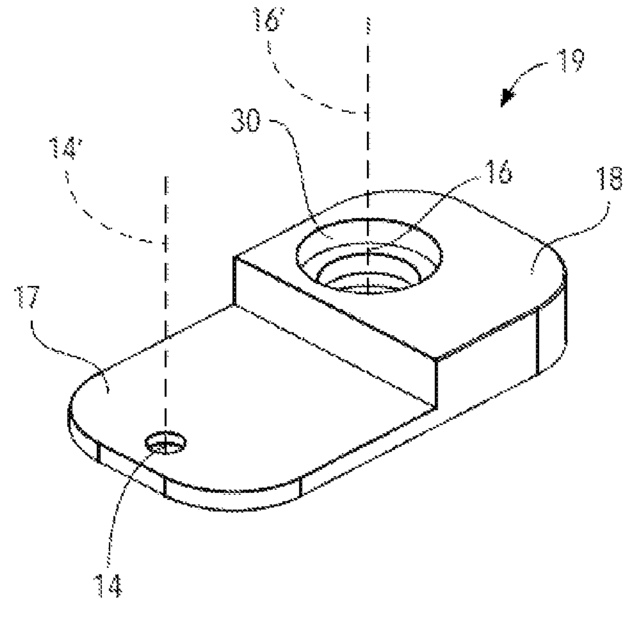
FIG. 7B is a perspective view of type 3 mounting bracket 33.
Figure 8A:
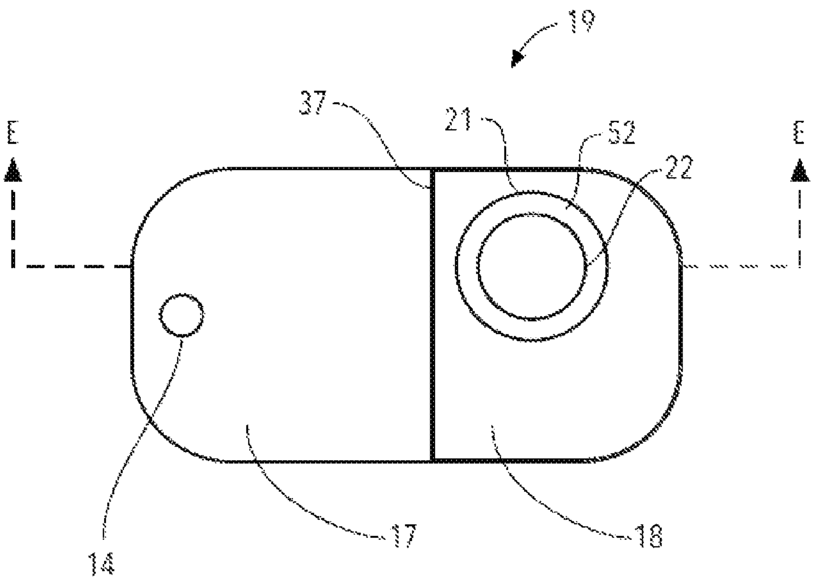
FIG. 8A is a top perspective view of type 3 mounting bracket 33.
Figure 8B:
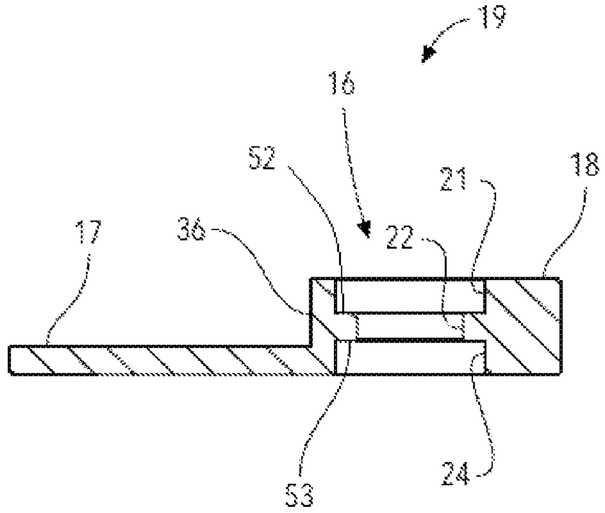
FIG. 8B is a cross-sectional view of type 3 mounting bracket 33 taken from perspective EE.

The following description should be taken in view of FIGS. 4 through 8B. FIG. 4 is a top perspective view of audio equipment stand 10 taken from perspective AA, FIG. 5 is a bottom view of audio equipment stand 10, FIG. 6 is a front cross-sectional view of compression assembly 20 taken from perspective DD, FIG. 7A is a perspective view of type 1 mounting bracket 31, FIG. 7B is a perspective view of type 3 mounting bracket 33, FIG. 8A is a top perspective view of type 3 mounting bracket 33, and FIG. 8B is a cross-sectional view of type 3 mounting bracket 33 taken from perspective EE.

Third level shelf 13.3 has a perimeter 35. Each of the plurality of mounting brackets 19 have one of the plurality of mounting centroids 14 and one of the plurality of compression centroids 16. Each of the plurality of mounting brackets 19 have a mounting section 17 and a compression section 18. Each mounting section 17 has one of the plurality of mounting centroids. The vertex is the mounting centroid 14 when said mounting bracket 19 is secured to their respective mounting location 47, said vertex belonging to a first polygon 11.

First polygon 11 has vertices at third level mounting centroid at first position 14.31, third level mounting centroid at second position 14.32, third level mounting centroid at third position 14.33, and third level mounting centroid at fourth position 14.34.

Each of the plurality of compression centroids 16 define a vertex belonging to a second polygon 12. Second polygon 12 has vertices at third level compression centroid at the first position 16.31, third level compression centroid at the second position 16.32, third level compression centroid at the third position 16.33, and third level compression centroid at the fourth position 16.34.

Each mounting axis of rotation 61 is comprised of the line segment that spans from one mounting centroid 14 to another mounting centroid 14 on the outer perimeter of first polygon 11(e.g., the line segment made from third level mounting centroid at first position 14.31 to third level mounting centroid at fourth position 14.34, and so on). Each mounting axis of rotation 61 is orthogonal to both of the mounting centroidal axes 14' that intersect at their respective mounting centroids 14.

Each compression axis of rotation 62 is comprised of the line segment that spans from one compression centroid 16 to another compression centroid 16 on the outer perimeter of second polygon 12(e.g., the line segment made from third level compression centroid at first position 16.31 to third level compression centroid at fourth position 16.34, and so on). Each mounting axis of rotation 61 is orthogonal to both of the compression centroidal axes 16' that intersect at their respective compression centroids 16.

In its current embodiment, each of the compression axes of rotation are non-parallel to their respective mounting axis of rotation. In other embodiments, as few as one compression axis of rotation is non-parallel to its respective mounting axis of rotation.

In its current embodiment, two of the mounting axes of rotation are parallel and orthogonal to the other two mounting axes of rotation, making first polygon rectangular. In its current embodiment, none of the compression axes of rotation are parallel to one another, making second polygon non-rectangular. If one force were to cause a rotation of two compression members about one compression axis of rotation, and another force were to cause a rotation of two different compression members about another compression axis of rotation, the structure will resist these rotations more than if these compression axes of rotations had been parallel.

In the current embodiment first polygon 11 is near rectangular, if not exactly rectangular. In the current embodiment the second polygon 12 is not rectangular, as the angle created at the third level compression centroid at the first position 16.31 is obtuse. It should be noted that an angle referenced at one of the vertices is in reference to the angle made by line segments, one of which is created by the respective vertex and the nearest clockwise vertex, and the other of which is created by the respective vertex and the nearest counterclockwise vertex.

In its current embodiment, first polygon 11 can be comprised of the shape made by the vertices at third level mounting centroid at first position 14.31, third level mounting centroid at second position 14.32, third level mounting centroid at third position 14.33, and third level mounting centroid at fourth position 14.34.

In its current embodiment, second polygon 12 can be comprised of the shape made by vertices at third level compression centroid at first position 16.31, third level compression centroid at second position 16.32, third level compression centroid at third position 16.33, and third level compression centroid at fourth position 16.34.

In its current embodiment, the shape made by the plurality of mounting centroids 14 at first level 91, the shape made by the plurality of mounting centroids 14 at second level 92, and the shape made by the plurality of mounting centroids 14 at third level 93, are substantially the same. Therefore, first polygon 11 can be determined by the plurality of mounting centroids 14 on first level 91, second level 92, or third level 93.

In its current embodiment, the shape made by the plurality of compression centroids 16 at first level 91, the shape made by the plurality of compression centroids 16 at second level 92, and the shape made by the plurality of compression centroids 16 at third level 93, are substantially the same. Therefore, second polygon 12 can be determined by the plurality of compression centroids 16 on first level 91, second level 92, or third level 93. Compression centroidal axis 16' shows the general axis that the compression centroid 16 of each level's mounting backet 19 would fall upon. Mounting axis 14' shows the general axis that mounting centroid 14 of each level's mounting backet 19 would fall upon.

Shelf abutting surface 36 abuts the shelf at perimeter 35. Line of demarcation 37 separates mounting section 17 from compression section 18 in the current embodiment.

FIG. 6 illustrates a cross-sectional view from the front perspective DD, showing end cap 28 abutting one of the plurality of mounting brackets at first radially inward facing surface 21, second radially inward facing surface 22, and third radially inward facing surface 23.

Each of vortex feet 50 comprises first radially outward facing surface 41, fourth radially outward facing surface 44, conical tip 45, and female end 27, further comprising third radially inward facing surface 23, fourth axial surface 54, and conical receiver 46.

Each of end caps 28 have fifth axial surface 55, and male end 25 comprising first axial surface 51, second radially outward facing surface 42, third radially outward facing surface 43 and dowel tip 26.

Each of compression members 15 comprise first radially outward facing surface 41, and female end 27, comprising third radially inward facing surface 23, fourth axial surface 54, and conical receiver 46. Further, each of said plurality of compression members 15 have male end 25 comprising first axial surface 51, second radially outward facing surface 42, third radially outward facing surface 43 and dowel tip 26.

Each of mounting brackets 19 have compression aperture 30 comprising first radially inward facing surface 21, second radially inward facing surface 22, fourth radially inward facing surface 24, second axial surface 52, and third axial surface 53.

Figure 9A:
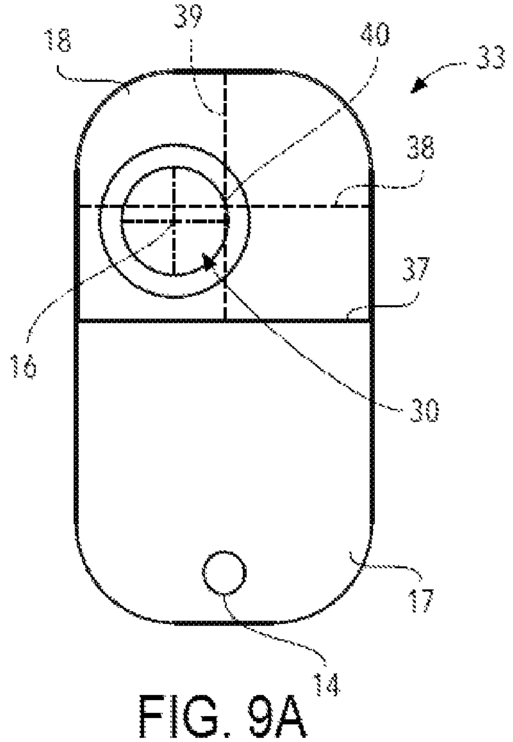
FIG. 9A is a top perspective view of a type 3 mounting bracket 33.
Figure 9B:
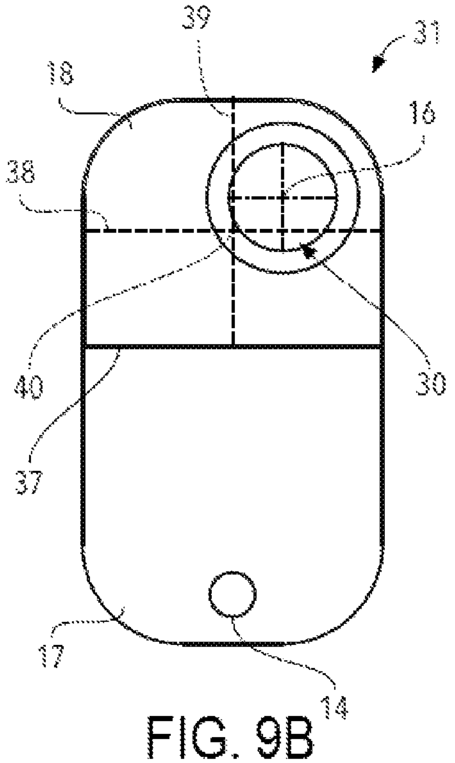
FIG. 9B is a top perspective view of a type 1 mounting bracket 31.
Figure 9C:
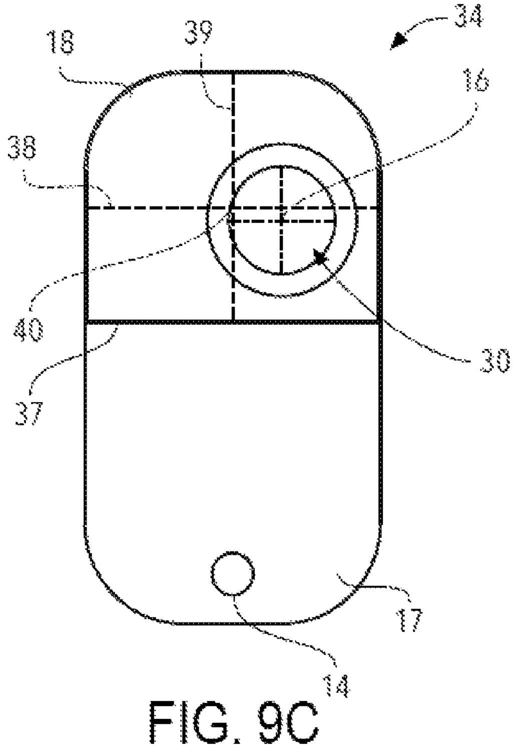
FIG. 9C is a top perspective view of a type 4 mounting bracket 34.
Figure 9D:
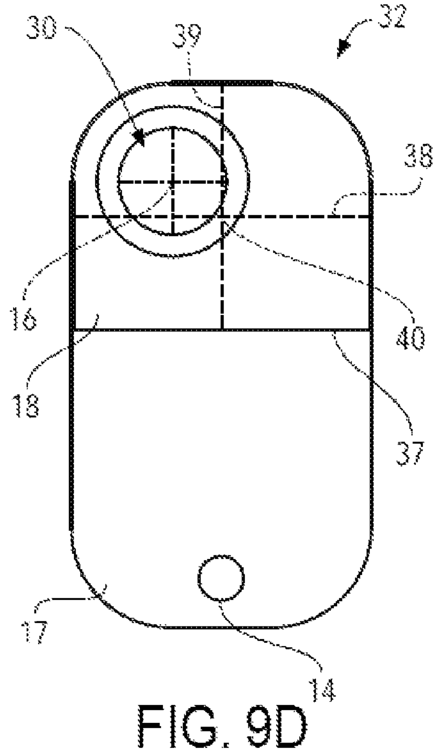
FIG. 9D is a top perspective view of a type 2 mounting bracket 32.

The following description should be taken in view of FIGS. 9A through 9D. FIG. 9A is a top perspective view of a type 3 mounting bracket 33. FIG. 9B is a top perspective view of a type 1 mounting bracket 31. FIG. 9C is a top perspective view of a type 4 mounting bracket 34. FIG. 9D is a top perspective view of a type 2 mounting bracket 32.

Line of demarcation 37 is parallel to x-axis 38. Line of demarcation 37 and x-axis 38 are generally perpendicular to y-axis 39. Y-axis 39 and x-axis 38 cross at an origin 40. These terms are borrowed from their mathematical descriptions; however, they are not meant to abide by every mathematical constraint or principle and are only used herein as a general descriptor. Type 1 mounting bracket 31 has compression centroid 16 in the first quadrant as defined in the Cartesian coordinate system. Type 2 mounting bracket 32 has compression centroid 16 in the second quadrant as defined in the Cartesian coordinate system. Type 3 mounting bracket 33 has compression centroid 16 in the third quadrant as defined in the Cartesian coordinate system. Type 4 mounting bracket 34 has compression centroid 16 in the fourth quadrant as defined in the Cartesian coordinate system.

Figure 10A:
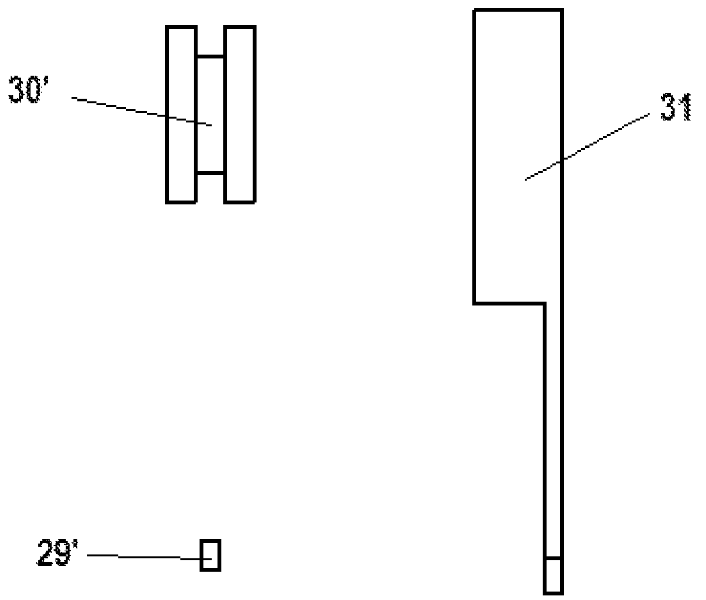
FIG. 10A is a side view of a type 1 mounting bracket 31.
Figure 10B:
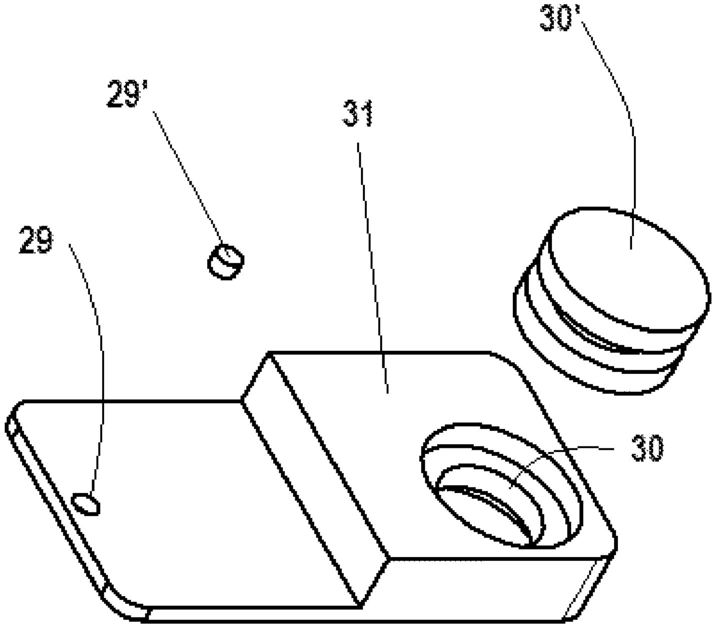
FIG. 10B is a perspective view of the type 1 mounting bracket shown in FIG. 10A.

The following description should be taken in view of FIGS. 10A through 10B. FIG. 10A is a side view of a type 1 mounting bracket 31. FIG. 10B is a perspective view of the type 1 mounting bracket 31 shown in FIG. 10A.

Compression aperture 30 is a 3-dimensional boundary. Compression mass 30' represents an object that would exist if the compression aperture 30 was filled with a homogenous material, which illustrates the shape of the compression aperture 30. Each compression mass 30' belongs to one respective compression aperture 30. Each compression centroid 16 is the geometric center of the corresponding compression aperture's 30 compression mass 30'. It should be appreciated that the compression mass is not part of the present invention and is illustrative only for purposes of defining the centroid of the aperture.

Mounting aperture 29 is a 3-dimensional boundary. Mounting mass 29' represents an object that would exist if the mounting aperture 29 was filled with a homogenous material, which illustrates the shape of the mounting aperture 29. Each mounting mass 29' belongs to one respective mounting aperture 29. Each mounting centroid 14 is the geometric center of the corresponding mounting aperture's 29 mounting mass 29'.

It should be appreciated that the compression section 18 of any one of the plurality of mounting brackets 19 is not necessitated by being removably affixed to one of the plurality of compression members 15. Other embodiments may have only first level 91, including the plurality of mounting brackets 19 removably affixed to first level shelf 13.1 at each of the plurality of mounting centroids 14, and being removably affixed to the plurality of vortex feet 50 at each of the plurality of mounting brackets 19, however, instead of being removably affixed to one of the plurality of compression members 15, each of the plurality of mounting brackets 19 could be removably affixed to one of the plurality of end caps 28, or to nothing at all.

It should be further appreciated that each mounting bracket 19 has a mounting centroid 14 and a compression centroid 16. In the current embodiment, each mounting bracket 19 has one mounting centroid 14 and one compression centroid 16. When referring to one internal angle of first polygon 11 and comparing it to its respective angle in second polygon 12, the comparison should be drawn between the angle made at the vertex formed by mounting centroid 14 and the angle made at the vertex formed by the compression centroid 16 belonging to the same mounting bracket 19. When referring to one internal angle of second polygon 12 and comparing it to its respective angle in first polygon 11, the comparison should be drawn between the angle made at the vertex formed by compression centroid 16 and the angle made at the vertex formed by mounting centroid 14, belonging to the same mounting bracket 19. Further, there is exactly one mounting axis of rotation 61 and exactly one compression axis of rotation 62 that spans between one mounting bracket 19 and another mounting bracket 19; the reference should be made to this mounting axis of rotation 61 and this compression axis 62 when referencing a mounting axis of rotation 61 and its respective compression axis of rotation 62 or vice versa.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting, where various presently unforeseen or unanticipated alternatives, modifications, variations, or improvements therein may be subsequently made by those skilled in the art which are also intended to be encompassed by the following claims. Therefore, other embodiments of the present invention are possible without departing from the spirit and scope of the present invention.

REFERENCE NUMERALS

10 Audio Equipment Stand
11 First Polygon
12 Second Polygon
13 Shelf
13.1 First Level Shelf
13.2 Second Level Shelf
13.3 Third Level Shelf
14 Mounting Centroid
14.31 Third Level Mounting Centroid at First Position
14.32 Third Level Mounting Centroid at Second Position
14.33 Third Level Mounting Centroid at Third Position
14.34 Third Level Mounting Centroid at Fourth Position
14' Mounting Centroidal Axis
15 Compression Member
15.11 First Level Compression Member at First Position
15.12 First Level Compression Member at Second Position
15.13 First Level Compression Member at Third Position
15.14 First Level Compression Member at Fourth Position
15.21 Second Level Compression Member at First Position
15.22 Second Level Compression Member at Second Position
15.23 Second Level Compression Member at Third Position
15.24 Second Level Compression Member at Fourth Position
16 Compression Centroid
16' Compression Centroidal Axis
16.31 Third Level Compression Centroid at First Position
16.32 Third Level Compression Centroid at Second Position
16.33 Third Level Compression Centroid at Third Position
16.34 Third Level Compression Centroid at Fourth Position
17 Mounting Section
18 Compression Section
19 Mounting Bracket
19.11 First Level Mounting Bracket at First Position
19.12 First Level Mounting Bracket at Second Position
19.13 First Level Mounting Bracket at Third Position
19.14 First Level Mounting Bracket at Fourth Position
19.21 Second Level Mounting Bracket at First Position
19.22 Second Level Mounting Bracket at Second Position
19.23 Second Level Mounting Bracket at Third Position
19.24 Second Level Mounting Bracket at Fourth Position
19.31 Third Level Mounting Bracket at First Position
19.32 Third Level Mounting Bracket at Second Position
19.33 Third Level Mounting Bracket at Third Position
19.34 Third Level Mounting Bracket at Fourth Position
20 Compression Assembly
21 First Radially Inward Facing Surface
22 Second Radially Inward Facing Surface
23 Third Radially Inward Facing Surface
24 Fourth Radially Inward Facing Surface
25 Male End
26 Dowel Tip
27 Female End
28 End Cap
28.31 Third Level End Cap at First Position
28.32 Third Level End Cap at Second Position
28.33 Third Level End Cap at Third Position
28.34 Third Level End Cap at Fourth Position
29 Mounting Aperture
29.11 First Level Mounting Aperture at First Position
29.12 First Level Mounting Aperture at Second Position
29.13 First Level Mounting Aperture at Third Position
29.14 First Level Mounting Aperture at Fourth Position
29.21 Second Level Mounting Aperture at First Position
29.22 Second Level Mounting Aperture at Second Position
29.23 Second Level Mounting Aperture at Third Position
29.24 Second Level Mounting Aperture at Fourth Position
29.31 Third Level Mounting Aperture at First Position
29.32 Third Level Mounting Aperture at Second Position
29.33 Third Level Mounting Aperture at Third Position
29.34 Third Level Mounting Aperture at Fourth Position
29' Mounting Mass
30 Compression Aperture
30' Compression Mass
31 Type 1 Mounting Bracket
32 Type 2 Mounting Bracket
33 Type 3 Mounting Bracket
34 Type 4 Mounting Bracket
35 Perimeter
36 Shelf Abutting Surface
37 Line of Demarcation
38 X-Axis
39 Y-Axis
40 Origin
41 First Radially Outward Facing Surface
42 Second Radially Outward Facing Surface
43 Third Radially Outward Facing Surface
44 Fourth Radially Outward Facing Surface
45 Conical Tip
46 Conical Receiver
47 Mounting Location
50 Vortex Feet
50.01 Vortex Foot at First Position
50.02 Vortex Foot at Second Position
50.03 Vortex Foot at Third Position
50.04 Vortex Foot at Fourth Position
51 First Axial Surface
52 Second Axial Surface
53 Third Axial Surface
54 Fourth Axial Surface
55 Fifth Axial Surface
56 Sixth Axial Surface
61 Mounting Axis of Rotation
62 Compression Axis of Rotation
90 Zeroth Level
91 First Level
92 Second Level
93 Third Level
101 First Position
102 Second Position
103 Third Position
104 Fourth Position

What is claimed is:

1. A storage stand, comprising:

at least one shelf, the at least one shelf bounded by a perimeter, the perimeter having at least four mounting locations defining an irregular quadrilateral polygon, the at least four mounting locations adapted to form a mounting axis of rotation with respect to its adjacent clockwise mounting locations and its adjacent counter-clockwise point; and, at least four mounting locations arranged on the perimeter of the at least one shelf, each of the four mounting locations having a compression centroid, each mounting location adapted to form a compression axis of rotation with respect to its adjacent clockwise mounting location and its adjacent counterclockwise mounting location such that at least one compression axis of rotation is non-parallel to its respective mounting axis of rotation.

2. The storage stand recited in claim 1 further comprising at least four compression members, each of the at least four compression members arranged to fixedly or removably engage one of the at least four mounting locations.

3. The storage stand recited in claim 2, wherein the at least four compression members are also arranged to fixedly or removably engage one of the at least four mounting locations of a second shelf of the at least one shelf.

4. The storage stand recited in claim 2 further comprising a second set of compression members, the second set of compression members comprising at least four compression members, each of the at least four compression members arranged to fixedly or removably engage one of the at least four mounting locations of a third shelf of the at least one shelf and one of the at least four mounting locations of either the first shelf or the second shelf.

5. The storage stand recited in claim 1 further comprising four vortex feet, each of the four vortex feet arranged to fixedly or removably engage one of the at least four mounting locations.

6. The storage stand recited in claim 4 further comprising four vortex feet, each of the four vortex feet arranged to fixedly or removably engage one of the at least four mounting locations of one of the first, second, or third shelf opposite the at least four compression members or the second set of compression members.

* * * * *